Figure 1:
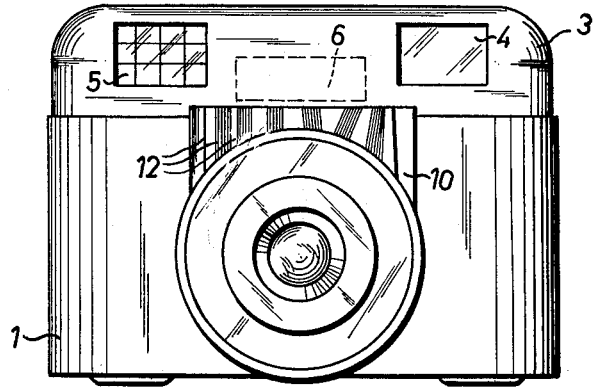

Jan. 9, 1962

W. H. VAN DER MEI 3,015,998

INDICATING DEVICE FOR BUILT-IN EXPOSURE
METER FOR A PHOTOGRAPHIC CAMERA

Filed May 20, 1960

3 Sheets-Sheet 1

INVENTOR
Wietse Hendrik Van Der Mei
by Blum, Moscovitz, Friedman
& Blum
Attorneys

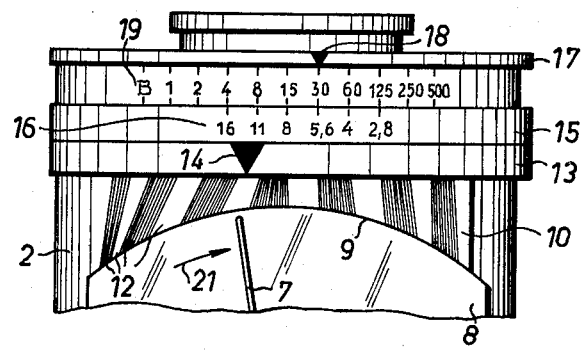
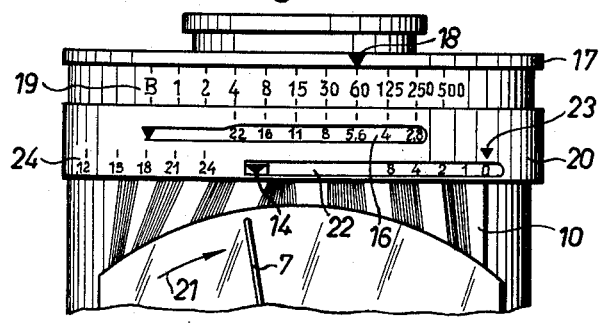
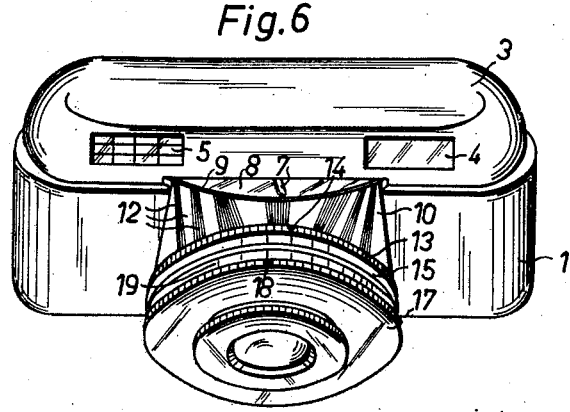

Jan. 9, 1962 W. H. VAN DER MEI 3,015,998
INDICATING DEVICE FOR BUILT-IN EXPOSURE
METER FOR A PHOTOGRAPHIC CAMERA
Filed May 20, 1960 3 Sheets-Sheet 3
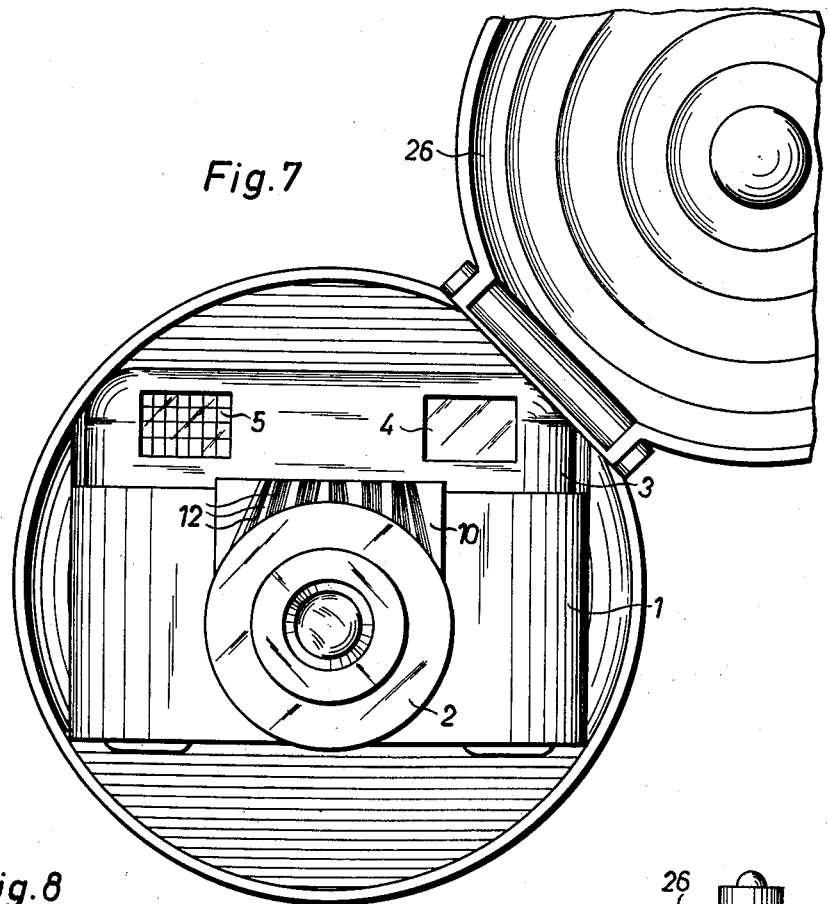
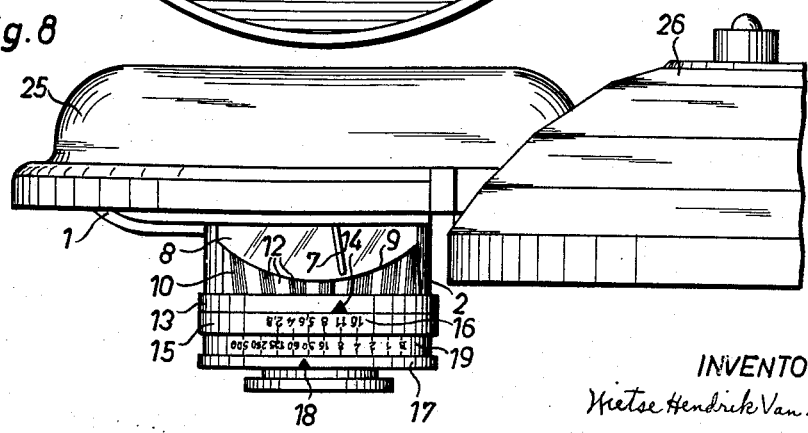
INVENTOR
Wietse Hendrik Van Der Mei
by Blum, Moscovitz, Friedman, & Blum
Attorneys

United States Patent Office 3,015,998
Patented Jan. 9, 1962

3,015,998
INDICATING DEVICE FOR BUILT-IN EXPOSURE METER FOR A PHOTOGRAPHIC CAMERA
Wietse H. van der Mei, Apeldoorn, Netherlands, assignor to Voigtlander A.G., Braunschweig, Germany, a corporation of Germany
Filed May 20, 1960, Ser. No. 30,509
Claims priority, application Germany May 22, 1959
3 Claims. (Cl. 95—10)

This invention relates to improvements in control means for regulation of exposure factors in photographic cameras. In particular, the invention simplifies the operating steps involved in setting the lens and shutter of a camera in conformity to the reading of an exposure indicating device, such as an exposure meter.

Without limitation thereto, the invention has particular application to a camera having a built-in exposure meter. In such a camera, in accordance with current practice, the measured value of the exposure meter must be read, noticed by the operator and utilized in adjusting the shutter which is located at another point of the camera. Some exposure meters are provided with directrices which are located in the plane of the pointer, or with so-called directrix fields which extend between the indicating measuring pointer path and the readable measuring value scale in such manner that the non-linear measuring indications of the pointer path are transferred to a linearized reading scale. A linearized reading scale, which is calibrated in light values, for example, is either desirable for more readable fields for the individual light value figures, or is necessary if a calculating device is associated with it, for example for the adjustment of diaphragm-time-combinations of equal light value. However, in the known arrangements, one or more measured values read on the exposure meter ordinarily must be memorized and utilized in shutter adjusting.

Reading of the measured value in the exposure meter takes place in a different plane and often in a different direction of sight relative to the plane of adjustment of exposure factors. The two planes are in most cases perpendicular to each other, or at least separated from each other in space. This renders the adjustment relatively troublesome. Moreover, the necessity of noticing the read value until after adjustment is completed is a burden on the memory of the operator and diverts his attention from other factors which have to be considered in order to obtain a satisfactory picture.

The problems of adjusting a camera with a built-in exposure meter is further complicated when the camera is provided with adjustment means to compensate for differences in film sensitivity. Such adjustment means are commonly in the form of an electric resistance in the meter or a brightness adjuster in front of the photocell, and are in either instance controlled by a rotary button on the upper camera wall. A further rotary member is commonly mounted on the objective tube and must be regulated in accordance with film sensitivity. Operation of these devices is troublesome and requires considerable care to avoid error. Also, additional mechanical parts are needed to obtain meter readings corresponding to variations in adjustment thereof to compensate for differences in film sensitivity.

An important object of this invention is to provide a camera which is to be adjusted in accordance with varying light conditions, in which the adjustment mechanism requires a minimum of readings to be taken by the operator and in which the adjustment mechanism is as simple as possible.

In accordance with preferred embodiments of the invention, it is used in conjunction with a camera having a built-in exposure meter and having two adjusting members on its objective lens and coupled to the diaphragm lamellae, a first member being connected to the exposure time adjuster and the second member serving for introduction of the exposure value indicated by the exposure meter. A field of directrices is provided, extending between the path of the tip of the exposure meter pointer and the first adjusting member. The directrices are arranged in a non-linear scale adjacent the meter, corresponding to the non-linear pointer deflection; and the pointer is deflected along the non-linear scale. The directrices are arranged in a second scale according to the linearity of the exposure factor scales adjacent the first adjusting member, which has a mark associated with the second scale. It is possible to move the second adjusting member so as to locate its mark opposite the division of the second scale associated with the directrix indicated by the meter pointer, and thereby to adjust the diaphragm to the correct light value. No reading of a number on the meter is necessary. No mechanical connections between the exposure meter indicating means and the exposure factor adjusters are required. The exposure meter indication, field of directrices and adjusting members may be observed and checked by a single glance.

In the arrangement according to the present invention, the field of directrices may advantageously connect the indication of the exposure meter with the adjusting members of a central shutter or of another camera shutter, such as a focal-plane shutter or of another camera shutter, such as a focal-plane shutter, which is provided with ring-shaped adjusters.

The use of a central shutter is particularly advantageous when the adjusting scales of its exposure factors are linearized, as in light value shutters. The adjustments on the objective may be effected by the use of adjustable scales or adjustable marks. Thereby, in a preferred embodiment of the invention, the light value scale proper need not appear at all and can be replaced by a simple adjustable mark. The knowledge of the light value number is, in general, of no interest to the operator. If he adjusts the mark relative to the field of directrices arranged according to the invention so as to coincide with the measuring deflection in each case, then he has unwittingly adjusted the correct light value automatically. Subsequently, he may select, in conventional manner, time and diaphragm values within the adjusted light value, in different combinations.

There are numerous other objects and advantages of the invention, which will become more fully apparent from the following description, in conjunction with the annexed drawing, in which preferred embodiments of the invention are disclosed.

Figure 2:
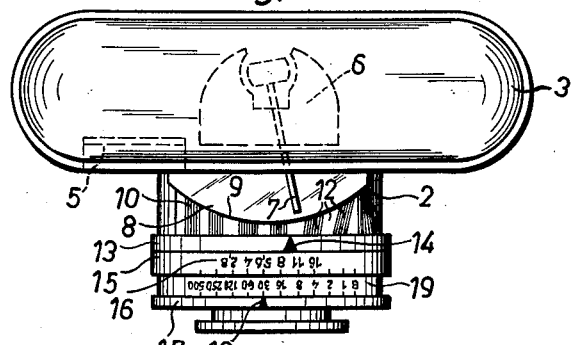
Figure 3:
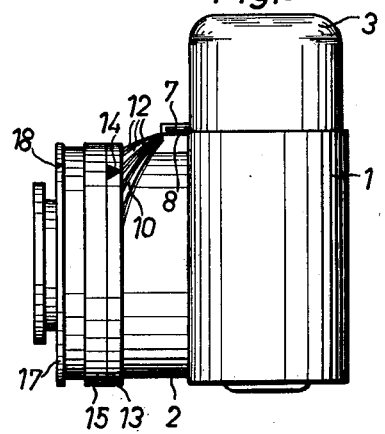

In the drawing,
FIG. 1 is a front elevational view of a camera which is equipped according to the invention;
FIG. 2 is a top plan view of the camera;
FIG. 3 is a side view of the camera;
FIG. 4 is a fragmentary view similar to FIG. 2, drawn to enlarged scale;
FIG. 5 is a view similar to FIG. 4, but showing a modified design of the adjusting members;
FIG. 6 is a perspective view of the camera shown in FIGS. 1–4;
FIG. 7 is a front elevation of a camera similar to that of FIG. 1, but mounted in a flash attachment; and
FIG. 8 is a top plan view of the camera of FIG. 7.

FIGS. 1–4 AND 6

Camera body 1 has a front fastened objective tube 2, the axis of which is taken as the axis of the camera. Camera 1 has a cap 3. Cap 3 includes a conventional view-finder, optionally direct vision view-finder 4. Cap 3 also includes photocell window 5 and electric meter 6.

Meter 6 has a measuring pointer 7 above pointer field 8 which is substantially planar. Pointer 7 is pivoted about an axis transverse thereto and is movable in a plane which is offset from and parallel to the axis of objective tube 2. It is assumed that, for increasing light values, pointer 7 moves in the direction of arrow 21. The position of pointer 7 corresponds to the available light conditions, in the usual manner. Part-circular arc 9, which is the front edge of pointer field 8, corresponds to the limits of movement of pointer 7. Ordinarily, but without limitation thereto, the movement of pointer 7 in response to variations in light conditions is non-linear.

Meter 6 is conventional and is not described in detail. However, because of the elimination of parts coupling the output of the meter to the adjusting members on objective tube 2, meter 6 need not be miniaturized to the extent previously necessary for built-in meters and may be relatively large and robust and more easily read.

In this embodiment, adjusting rings 13, 15 and 17 are rotatably mounted upon objective tube 2 in forward succession from camera body 1. It will be apparent that these rings may be associated with any suitable shutter adjustment mechanism. Thus, the shutter may be a central shutter having diaphragm lamellae coupled at respective ends thereof to rings 15 and 17. Ring 15 may be releasably coupled to ring 13. Ring 13 may be turned in accordance with the meter reading to adjust the diaphragm according to the light value measured by the meter. Ring 13 may be turned relative to ring 15 when necessary to adjust for varying film sensitivities. Ring 17 may be turned to adjust the diaphragm and shutter in accordance with the selected light value reading. Ring 17 may carry a mark 18 and may be moved relative to fixed time scale 19 which is located between rings 15 and 17. Ring 15 carries diaphragm scale 16. Once mark 14 on ring 13 is located at the desired light value setting, ring 17 may be turned to obtain the desired corresponding diaphragm and shutter settings.

While any suitable adjustment means may be employed, the important consideration for the invention is that ring 13 carrying mark 14 must be turned in accordance with a selected scale, which is ordinarily a linear scale corresponding to the adjustment scales of the diaphragm and shutter (scales 16 and 19) and which is ordinarily different from the non-linear meter scale, to locate mark 14 at a point corresponding to the location of pointer 7 determined by the light conditions encountered in use of the camera.

In accordance with the invention, a member 10 carrying a series of directrices 12 is mounted on the camera, by any suitable means, so as to extend between arc 9 of meter plate 8 and the upper rear edge portion of ring 13. The upper or rear end of member 10 is of the same width and shape as arc 9, and the directrices 12 are arranged at this end in a thickness and spacing corresponding to the meter scale. The lower or front end of member 10 follows the contour of the periphery of ring 13, and the directrices 12 are arranged at this end in a thickness and spacing corresponding to the scale of movement of rings 13 and 15. By way of illustration, the upper scale of directrices 12 may be calibrated in light value numbers as detected by the exposure meter, and the lower scale of directrices 12 may be linear and in the range permitting adjustment of the diaphragm in correspondence to the light value numbers by turning ring 13 relative to the scale. In other words, the two scales may be such that by the operator merely locating mark 14 opposite the same directrix which is opposite pointer 7, ring 13 is automatically set in accordance with the light value number of the light measured by the meter.

Since the operator does not have to memorize the light value number determined by the meter, the light value scale is omitted from plate 8 as being of no consequence in the use of the invention.

In summary, in the use of the invention, in the viewfinding position of the camera, the exposure value is measured and the tip of pointer 7 points to one of the directrices or guide channels 12 (optionally, pointer 7 is arrested in position). If now the operator turns the coupled adjusting rings 13 and 15 so that mark 14 is at the guide channel indicated by pointer 7, then one of the diaphragm ends is adjusted corresponding to the measured light value; and the scale 16 is displaced in such manner that, on the latter and on the stationary scale 19, the time-diaphragm-combinations which correspond to the measured light value are opposite each other. It is then only necessary to adjust mark 18 to the desired time value of scale 19 or to the desired diaphragm value of scale 16, by turning adjusting ring 17 which is connected with the other ends of the diaphragm lamellae; and correct adjustment of the exposure is accomplished.

FIG. 5

In this modification, rings 13 and 15 are replaced by cylindrical adjusting housing 20 and associated parts. Filter factor scale ring 22, under housing 20 and visible through a window therein, carries mark 14 for location relative to directrices 12 in the same manner as in the embodiment of FIGS. 1–4 and 6. In addition, ring 22 can be adjusted circumferentially relative to mark 23 on housing 20. Diaphragm scale ring 16, under housing 20 and visible through a further window therein, carries a mark and may be adjusted circumferentially relative to fixed scale 24 on housing 20 to compensate for the film sensitivity.

FIGS. 7 AND 8

Camera 1 is shown as mounted in flashlamp case 25 with hinged cover 26 which serves when opened (as shown in the drawing) as a swing-out reflector. The important consideration is that since neither the meter nor any scale has to be read or adjusted from the rear of the camera, the camera can be operated within the case, the deflection of pointer 7 observed, the field of directrices 12 surveyed and rings 13, 15 and 17 operated, all without removing the camera from the case.

While preferred embodiments of the invention have been disclosed, and various possible modifications, omissions and additions have been indicated, it will be apparent that these embodiments are by way of illustration only, and that various other modifications, omissions and additions may be made in the invention without departing from the scope and spirit thereof.

The arrangement of the adjusting scales and adjusting marks has to be that they, or at least some of them, are adjustable relative to each other. The sequence of the individual adjusting elements in the arrangement and the manner in which they cooperate are rather variable. In principle, the functions of the various stationary and movable adjusting members can be varied among one another.

The field of directrices according to the invention is not necessarily dependent on the use of a photoelectric exposure meter. Other light-measuring systems can also be used with equally favorable effect. For example, particularly in relatively inexpensive camera types, the device for determining the exposure value may quite simply consist of a manually adjustable pointer, the adjustment of which, in conformity with correct light value, is carried out relative to an exposure table which is fastened to the camera body and is preferably designed as a round disc provided with exposure symbols.

It is within the scope of the invention that the exposure meter (the photocell and the electric measuring instrument including an indicating field projecting beyond the front surface of the camera body) be designed as a compact structural unit which is inserted in the manufacture as a unitary whole during assembly of the camera and can be easily exchanged as a whole in the case of damage in operation without the use of particularly specialized labor. Thereby, the assembly and repairs can be done easier and are rendered less expensive. For particular purposes it may be of advantage to coordinate, with the compact unit of the exposure meter aggregate, the field of directrices, whereby, after an exchange, an additional adjusting step for calibrating the pointer deflection and the field of directrices becomes unnecessary. Moreover, within the scope of the invention, such a light measuring and adjusting aggregate can be designed and used as an attachable auxiliary instrument for conventional camera types which are on the market.

It is also within the scope of the invention to design the field of directrices by itself, or together with other camera parts, as an exchangeable component. Thus, for photographic cameras having exchangeable objectives, it is possible to exchange the field of directrices together with the objectives. This has the advantage of adapting the various fields of directrices at one end to the measuring pointer field, which is the same for all objectives, and at the other end to the diameters of the various objectives, to various objective scales and to similar features which are characteristic to the individual exchangeable objectives.

Various other changes, omissions and additions can be made.

What is claimed is:

1. In a photographic camera having a shutter and a diaphragm, the lamellae of the diaphragm being adjustable by means of two diaphragm controls, one of which is coupled with the exposure time setter while the other of which is adjustable in accordance with the light value indications of a photographic exposure meter having an indicator movable non-linearly in accordance with linear changes in light values, the camera including setters for exposure factors, including diaphragm aperture, and the setters for exposure factors being in the form of coaxial relatively rotatable rings carrying linear scales of respective exposure factors: the improvement comprising a directrix field extending between the path of the indicating portion of said indicator and said diaphragm aperture setter; the ends of the directrices adjacent such path having spacings corresponding to the non-linear deflection of said indicator, and the ends of the directrices adjacent said diaphragm aperture setter having uniform and equal spacings corresponding to the linearity of the exposure factors; said diaphragm aperture setter carrying a mark cooperable with the last-named ends of said directrices for alignment with one end of a directrix having its other end aligned with the indicating portion of said indicator.

2. In a photographic camera as claimed in claim 1: said rings being coaxial with and rotatable about the optical axis of the camera; said indicator being movable in a plane which is spaced from said optical axis; said directrix field being provided on a member having an edge conforming to the path of the indicating portion of said indicator and an edge conforming to a peripheral portion of said diaphragm aperture setter; said member having scales extending along each of said edges thereof and said directrices interconnecting corresponding graduations of the two scales.

3. In a photographic camera as claimed in claim 1: said camera including a body, a cap on the top of the body, and a tubular objective housing extending forwardly from the body; said rings being rotatably mounted on and coaxial with said objective housing; said exposure meter being mounted in said cap and said indicator comprising a pointer movable in a plane parallel to the axis of said objective housing and pivotal about an axis transverse to said pointer, the free end of said pointer constituting the indicating portion of said indicator and being movable through an arc of a selected length; said directrix field being provided on a member mounted on said camera and having one edge adjacent and extending conformingly along a selected arc of said diaphragm aperture setter and a second edge adjacent to, extending conformingly along, and of substantially the same length as, the arc of movement of the free end of said pointer; said member having scales extending along each of said edges thereof, and said directrices interconnecting corresponding graduations of the two scales.

References Cited in the file of this patent
UNITED STATES PATENTS

| | | |
|---|---|---|
| 2,252,573 | Leitz | Aug. 12, 1941 |
| 2,358,083 | Mihalyi | Sept. 12, 1944 |
| 2,849,936 | Fahlenberg | Sept. 2, 1958 |